(No Model.) 2 Sheets—Sheet 1.
W. EBERHARD.
VEHICLE WHEEL.
No. 251,354. Patented Dec. 27, 1881.
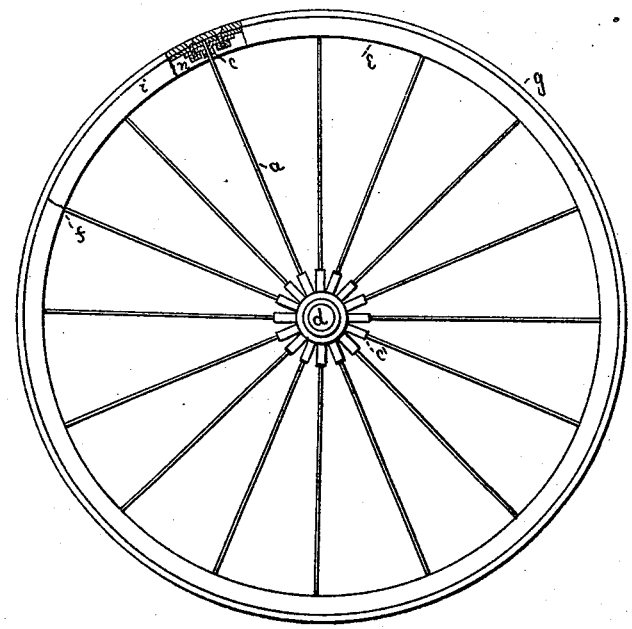
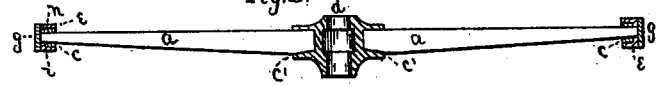
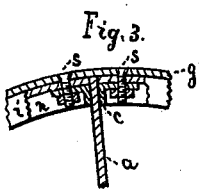 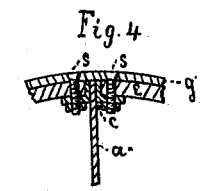

(No Model.)  2 Sheets—Sheet 2.

W. EBERHARD.
VEHICLE WHEEL.

No. 251,354. Patented Dec. 27, 1881.

Witnesses
George F. Robinson
James Warren Holcomb

Inventor
William Eberhard
by Bradford Howland
Atty.

UNITED STATES PATENT OFFICE.

WILLIAM EBERHARD, OF AKRON, OHIO.

VEHICLE-WHEEL.

SPECIFICATION forming part of Letters Patent No. 251,354, dated December 27, 1881.

Application filed January 10, 1881. (No model.)

*To all whom it may concern:*

Be it known that I, WILLIAM EBERHARD, of Akron, Summit county, Ohio, have invented a new and useful Improvement in Vehicle-Wheels, of which the following is a specification.

The nature and object of my invention is, first, a wheel provided with spokes made of thin plates or strips of steel, whose ends are held in sockets; and, second, the steel spokes in combination with metallic fellies provided with flanges, and spoke-sockets attached to the fellies between the flanges.

Figure 5:
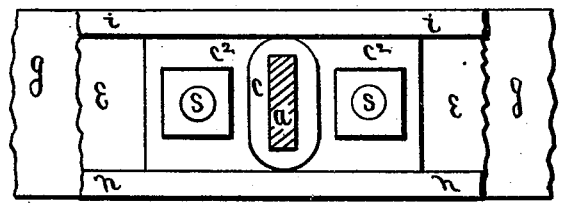
Figure 6:
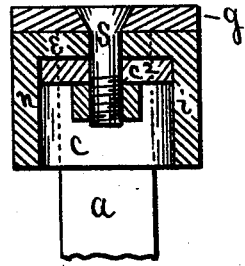

In the drawings, Figure 1 is a side elevation. Fig. 2 is a section of the wheel. Fig. 3 represents, on an enlarged scale, the combination of the spoke with the metallic felly and socket. Fig. 4 represents, on an enlarged scale, the combination of the steel spoke and socket with a wooden felly. Fig. 5 represents, on an enlarged scale, the inner side of a portion of the felly and tire, a socket, and a section of a spoke which enters the socket. Fig. 6 is a cross-section of the tire, felly, and flange $c^2$ of the socket-piece at one of the bolts $s$.

The spoke $a$ is a thin flat strip of steel, wider at the hub $d$ than at the outer end, which enters socket $c$. It is driven firmly into the socket $c'$ of hub $d$. The two ends of the metallic felly $e$, Fig. 1, meet at $f$. The felly $e$, tire $g$, and sockets $c$ are bolted together by bolts $s\ s$, which pass through flanges $c^2\ c^2$ of socket $c$. The socket $c$ is placed in the groove formed by the flanges $i\ n$ of felly $e$. The outer end of spoke $a$ extends through socket $c$ and felly $e$ and rests against the inside of tire $g$, as indicated by dotted lines in Fig. 6. Sockets $c'$ form a part of the metallic hub $d$. When the felly $e$ is of wood the position of socket $c$ may be reversed, as shown in Fig. 4, the socket $c$ extending through the felly and the end of the socket resting against the inside of tire $g$.

I claim as my invention—

1. A vehicle-wheel provided with thin steel spokes, in combination with felly $e$, metallic sockets $c$, having flanges $c^2\ c^2$, tire $g$, and bolts $s\ s$, the socket-pieces, felly, and tire being held together by the bolts passing through them, substantially as described.

2. In a vehicle-wheel, steel spokes $a$, in combination with hub $d$, having sockets $c'$, the thin metallic felly $e$, having inner flanges $i\ n$, forming a groove between them, metallic socket $c$, having flanges $c^2\ c^2$, and tire $g$, the socket $c$ being between flanges $i$ and $n$ and bolted at opposite sides of the spoke, through socket-flanges $c^2\ c^2$ and felly $e$, to tire $g$, substantially as described.

WILLIAM EBERHARD.

Witnesses:
C. R. GRANT,
GEO. N. THOMAS.